US006760504B2

(12) United States Patent
Duer

(10) Patent No.: US 6,760,504 B2
(45) Date of Patent: Jul. 6, 2004

(54) OPTICAL SWITCHING SYSTEM WITH POWER BALANCING

(75) Inventor: Reuven Duer, Moshav Talmei Elazar (IL)

(73) Assignee: Lynx Photonic Networks Inc., Calabasas Hills, CA (US)

( * ) Notice: Subject to any disclaimer, the term of this patent is extended or adjusted under 35 U.S.C. 154(b) by 0 days.

(21) Appl. No.: 10/158,589

(22) Filed: May 31, 2002

(65) Prior Publication Data

US 2002/0154853 A1 Oct. 24, 2002

Related U.S. Application Data

(63) Continuation of application No. 09/739,709, filed on Dec. 20, 2000, now Pat. No. 6,445,843.

(51) Int. Cl.[7] .................................................. G02B 6/35
(52) U.S. Cl. ......................................... 385/17; 385/140
(58) Field of Search ............................ 385/16, 17, 48, 385/140; 398/45

(56) References Cited

U.S. PATENT DOCUMENTS

| 5,010,542 | A | | 4/1991 | Pfaff | |
|---|---|---|---|---|---|
| 5,892,864 | A | | 4/1999 | Stoll et al. | |
| 6,285,809 | B1 | | 9/2001 | Nir et al. | |
| 6,445,843 | B1 | * | 9/2002 | Duer ........................... | 385/17 |
| 6,597,830 | B1 | * | 7/2003 | Nakabayashi et al. ........ | 385/24 |
| 2001/0022875 | A1 | * | 9/2001 | Asahi ........................... | 385/17 |
| 2002/0071628 | A1 | * | 6/2002 | Zang et al. .................... | 385/17 |

FOREIGN PATENT DOCUMENTS

| WO | WO99/60434 | | 11/1999 | | |
|---|---|---|---|---|---|
| WO | WO 00/02085 A1 | * | 1/2000 | ................... | 385/17 |

OTHER PUBLICATIONS

Y. Li, "A Waveguide EDFA Gain Equalizer Filter", Electronics Letters, vol. 31, pp 2005–2006 (1995) (Nov.).
C. Parker, "Dynamic Holographic Spectral Equalization for WDM", IEEE Photonics Technology Letters, vol. 9 pp. 529–531 (1997) (Apr.).
Ford et al, "Dynamic Spectral Power Equalization Using micro–opto Mechanics", IEEE Photonics Technology Letters, vol. 10, pp 1440–1442 (1998) (Oct.).

* cited by examiner

*Primary Examiner*—John D. Lee
*Assistant Examiner*—Mike Stahl
(74) *Attorney, Agent, or Firm*—Mark M. Friedman

(57) ABSTRACT

A system for switching optical energy from a plurality of input waveguides to a plurality of output waveguides, while balancing power in the output waveguides, and a method for its use. The system is based on an optical switch matrix that includes, for each input waveguide and for each output waveguide, one or more attenuators that divert an adjustable portion of the optical energy, that enters via that input waveguide, to that output waveguide. Preferably, each input waveguide is coupled to each output waveguide via a pair of 2×2 mach-Zehnder interferometers, a first of which has an idle input port and a second of which has an idle output port. The system also includes a feedback mechanism that taps fixed portions of the power in either the input waveguides or the output waveguides, and adjusts the attenuators accordingly.

11 Claims, 6 Drawing Sheets

OPTICAL SWITCHING SYSTEM WITH POWER BALANCING

This is a continuation of U.S. patent application Ser. No. 09/739,709 filed Dec. 20, 2000, now U.S. Pat. No. 6,445,843.

FIELD AND BACKGROUND OF THE INVENTION

The present invention relates to the switching of optical signals and, more particularly, to an optical switching system that facilitates output power balancing.

In an optical communication network based on Dense Wavelength Division Multiplexing, signals carried on carrier waves of different wavelengths are liable to have different optical powers, for several reasons. One reason is that such a network uses optical amplifiers to maintain signal power. The optical gain of an optical amplifier is not flat, as a function of wavelength. Therefore, even if the incoming multiplexed signals are equal in power, the outgoing multiplexed signals generally are not equal in power. A second reason is that the multiplexed signals typically have different origins, and so have suffered different propagation losses, as a result of having traveled different distances, by the time these signals reach an optical amplifier. If the range of signal powers among the multiplexed signals entering an optical amplifier is too great, the amplifier becomes saturated, resulting in unacceptable data loss.

Two different approaches have been used to solve this problem. The first approach is to flatten the response curve of the system (which is a composite of the response curves of the optical amplifier and of any other wavelength-dependent component, such as filters) by introducing a loss curve that is reciprocal to the response curve. This can be done passively (Y. Li, "A waveguide EDFA gain equalizer filter", *Electronics Letters*, vol. 31 pp. 2005–2006, 1995) or dynamically (M. C. Parker, "Dynamic holographic spectral equalization for WDM", IEEE Photon *Technology Letters*, vol. 9 pp. 529–531, 1997; J. E. Ford and J. A. Walker, "dynamic spectral power equalization using micro-opto mechanics", *IEEE Photon Technology Letters*, vol. 10 pp. 1440–1442, 1998). In this approach, the signals remain multiplexed on a common optical waveguide. The second approach demultiplexes the signals to respective channels and attenuates each channel using an optical attenuator.

Optical switches such as 2×2 and 1×2 Mach-Zehnder interferometers can be used as attenuators. FIG. 1 shows a Mach-Zehnder interferometer 10. Interferometer 10 is based on two more-or-less parallel waveguides, an upper waveguide 12 and a lower waveguide 14. Waveguides 12 and 14 are coupled to each other in a first 3 dB directional coupler 16 and in a second 3 dB directional coupler 18. In-between directional couplers 16 and 18, each waveguide 12 and 14 passes through a respective phase shifter 20 and 22. Left end 24 of upper waveguide 12 serves as an input port of interferometer 10. Right end 26 of upper waveguide 12 serves as an output port of interferometer 10. Right end 28 of lower waveguide 14 is an idle port.

The operation of interferometer 10 is as follows. Coherent light entering interferometer 10 at input port 24 is split by directional coupler 16, with half the light continuing rightward in upper waveguide 12 and the other half of the light propagating rightward in lower waveguide 14. Phase shifters 20 and 22 are used to change the relative phases of the light in waveguides 12 and 14. Directional coupler 18 then causes some or all of the light to emerge from interferometer 10 via output port 26 and/or idle port 28, depending on the phase difference, between the light in upper waveguide 12 and the light in lower waveguide 14, that is induced by phase shifters 20 and 22.

FIG. 2 shows the power leaving a specific Mach-Zehnder interferometer 10 via output port 28, relative to the power entering this interferometer 10 via input port 24, in dB, versus the heating power applied to either phase shifter 20 or phase shifter 22. This specific Mach-Zehnder interferometer 10 was fabricated using $SiO_2$ on Si technology, for light of a wavelength of 1.55 microns. Maximum attenuation, of 35 dB, is obtained at point I (approximately 50 mW heating power). Minimum attenuation is obtained at point II (approximately 610 mW heating power). This Mach-Zehnder interferometer 10 therefore is capable of a 35 dB attenuation range. When this Mach-Zehnder interferometer 10 is used as a switch, point I corresponds to the switch being OFF, with almost all power leaving the switch via output port 26, and point II corresponds to the switch being fully ON, with almost all power leaving the switch via output port 28.

The resolution of the attenuation depends on the resolution of the heating power used in phase shifters 20 and 22.

SUMMARY OF THE INVENTION

2×2 and 1×2 optical switches also are used as elements in optical switch matrices, such as those taught in PCT application WO 99/60434 and U.S. Pat. No. 6,285,809, for switching optical signals from input waveguides to output waveguides. The present invention is an optical switching system based on an optical switch matrix that combines the switching functionality of optical switches such as Mach-Zehnder interferometer 10 with the attenuation functionality of such optical switches in a single unit.

Therefore, according to the present invention there is provided an optical switching system, for switching optical energy from a plurality of input waveguides to a plurality of output waveguides, including: (a) for each output waveguide: for each input waveguide: at least one respective attenuator for diverting an adjustable portion of the optical energy entering via the each input waveguide to the each output waveguide.

Furthermore, according to the present invention there is provided a method of switching each of a plurality of optical signals, that travel on respective input waveguides, from the respective input waveguide thereof to a desired one of a plurality of output waveguides, including the steps of: (a) providing an optical switch matrix including: for each output waveguide: for each input waveguide: at least one respective attenuator for diverting an adjustable portion of the signal that travels on the each input waveguide to the each output waveguide; (b) selecting the attenuators that divert the optical signals to the desired output waveguides; and (c) adjusting the selected attenuators to balance powers of the optical signals in the output waveguides.

The optical switching system of the present invention is based on an optical switch matrix that includes, for each input waveguide and for each output waveguide, a set of one or more optical switches for diverting an adjustable portion of the optical energy in the input waveguide to the output waveguide. At least one of the optical switches in each set is an attenuator, preferably a Mach-Zehnder attenuator. Preferably, the switches are 2×2 switches. If there are two switches per set, one for input and the other for output, then the input switch has an idle input port and the output switch has an idle output port. The input switch of the last switch set of each input waveguide also has an idle output port, and the output switch of the first switch set of each output waveguide also has an idle input port.

Preferably, the optical switching system of the present invention includes a feedback mechanism for adjusting the attenuators to balance the output powers in the output waveguides. The feedback mechanism includes a power measurement device such as a spectrum analyzer, a set of taps for diverting fixed portions of the optical energy from either the input waveguides or the output waveguides to the spectrum analyzer, and a control unit that receives signals from the spectrum analyzer that indicate the power levels in the tapped waveguides and that adjusts the attenuators on the basis of these signals. Most preferably, each tap includes a directional coupler that is coupled to a respective input or output waveguide.

By "balancing" the output powers in the output waveguides is meant adjusting the output powers in the output waveguides to facilitate the accurate transmission of signals downstream from the optical switching system. Usually, this balancing is done by equalizing the powers in all the output waveguides; but there are circumstances in which the powers are balanced by adjusting them to have mutual ratios not equal to unity. For example, some of the signals may be destined for respective destinations that are farther downstream than other signals. If the powers of all the signals are equalized, then, because signal attenuation varies in the same sense as distance traveled, the signals with distant destinations arrive at their destinations with lower powers than the signals with nearby destinations. In that case, it often is desirable to adjust the powers of the signals with distant destinations to higher levels than the powers of the signals with nearby destinations, so that all the signals arrive at their respective destinations with equal powers.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an optical switching system that can be used to switch optical signals from input waveguides to output waveguides while balancing power in the output waveguides.

The principles and operation of an optical switching system according to the present invention may be better understood with reference to the drawings and the accompanying description.

Figure 3:
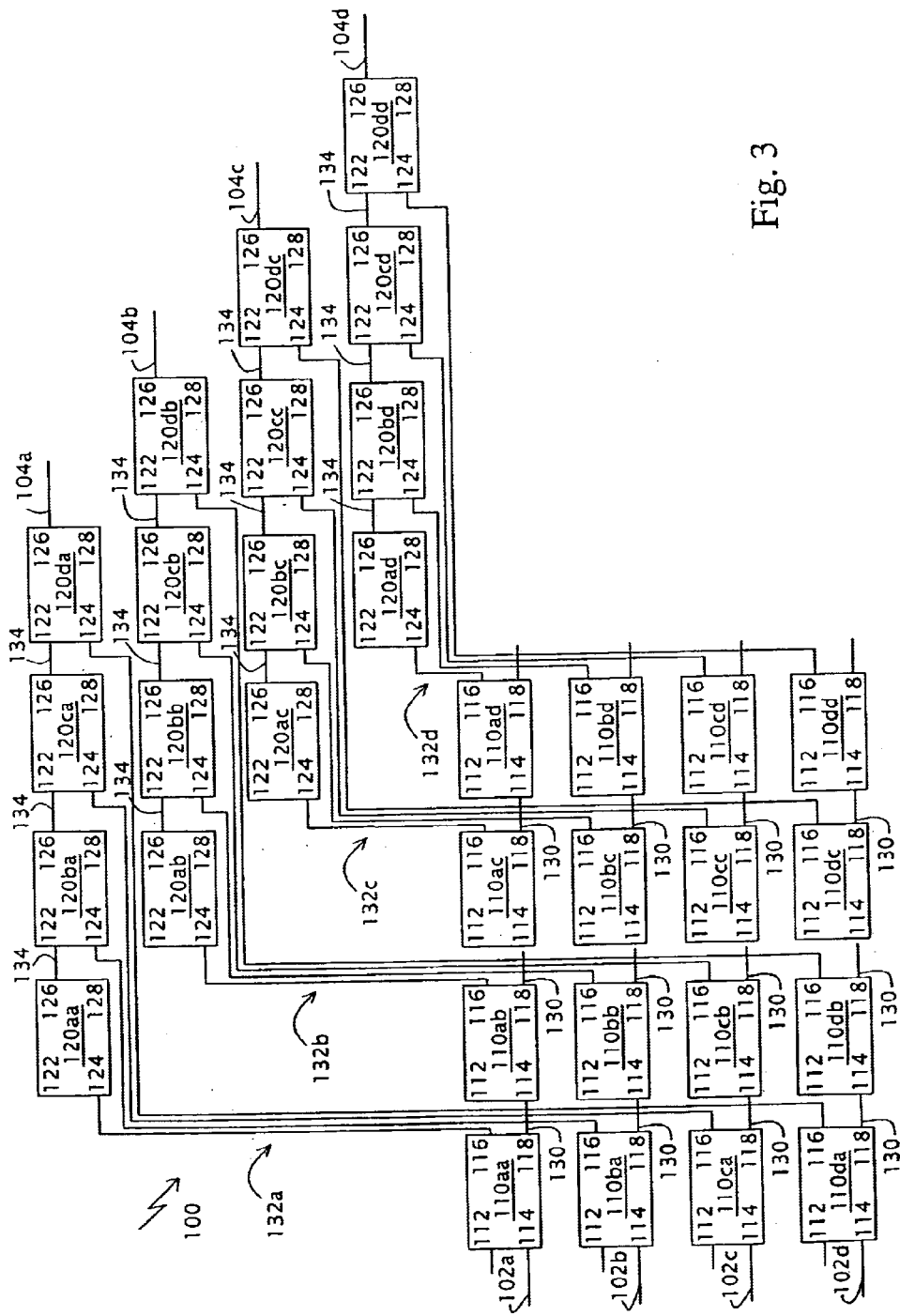
FIG. 3 illustrates the architecture of an optical switch matrix of the present invention.

Referring again to the drawings, FIG. 3 illustrates the architecture of an optical switch matrix 100 of the present invention that resembles the optical switch matrices taught in WO 99/60434. Optical switch matrix 100 connects four input waveguides 102 to four output waveguides 104. For this purpose, optical switch matrix 100 includes sixteen input attenuators 110 and sixteen output attenuators 120. Each attenuator 110 or 120 is a Mach-Zehnder interferometer that is substantially identical to Mach-Zehnder interferometer 10. Each input attenuator 110 has an upper input port 112, a lower input port 114, an upper output port 116 and a lower output port 118. Similarly, each output attenuator 120 has an upper input port 122, a lower input port 124, an upper output port 126 and a lower output port 128. Each input waveguide 102 is coupled to each output waveguide 104 by a respective input attenuator 110 and a respective output attenuator 120. The input attenuator 110 and of the output attenuator 120 that couple a particular input waveguide 102 to a particular output waveguide 104 are labeled by the corresponding letters: input attenuator 110*aa* and by output attenuator 120*aa* couple input waveguide 102*a* to output waveguide 104*a*, input attenuator 110*ab* and output attenuator 110*ab* couple input waveguide 102*a* to output waveguide 102*b*, etc.

More specifically, input waveguides 102 lead into lower input ports 114 of input attenuators 110 that couple to output waveguide 104*a*, and output waveguides 104 emerge from upper output ports 126 of output attenuators 120 that couple to input waveguide 102*d*. Each input attenuator 110 is coupled to its respective output attenuator 120 by a respective intermediate waveguide 132 that leads from upper output port 116 of that input attenuator 110 to lower input port 124 of that output attenuator 120. All upper input ports 112 of input attenuators 110 are idle. Similarly, all lower output ports 128 of output attenuators 120 are idle. Lower output ports 118 of input attenuators 110 that couple to output waveguide 104*d* are idle; and a respective intermediate waveguide 130 leads from lower output port 118 of each of the other input attenuators 110 to lower input port 114 of input attenuator 110 that couples the same input waveguide 102 to the next output waveguide 104. Similarly, upper input ports 122 of output attenuators 120 that couple to input waveguide 102*a* are idle; and a respective intermediate waveguide 134 leads to upper input port 122 of each of the other output attenuators 120 from upper output port 126 of output attenuator 120 that couples the same output waveguide 104 to the preceding input waveguide 102. As in Mach-Zehnder interferometer 10, lower input port 114 and lower output port 118 of each input attenuator 110 actually are opposite ends of the same internal lower waveguide, and upper input port 122 and upper output port 126 of each output attenuator 120 actually are opposite ends of the same internal upper waveguide, so that intermediate waveguides 130 actually are extensions of respective input waveguides 102 and intermediate waveguides 134 actually are extensions of respective output waveguides 104.

Figure 1:
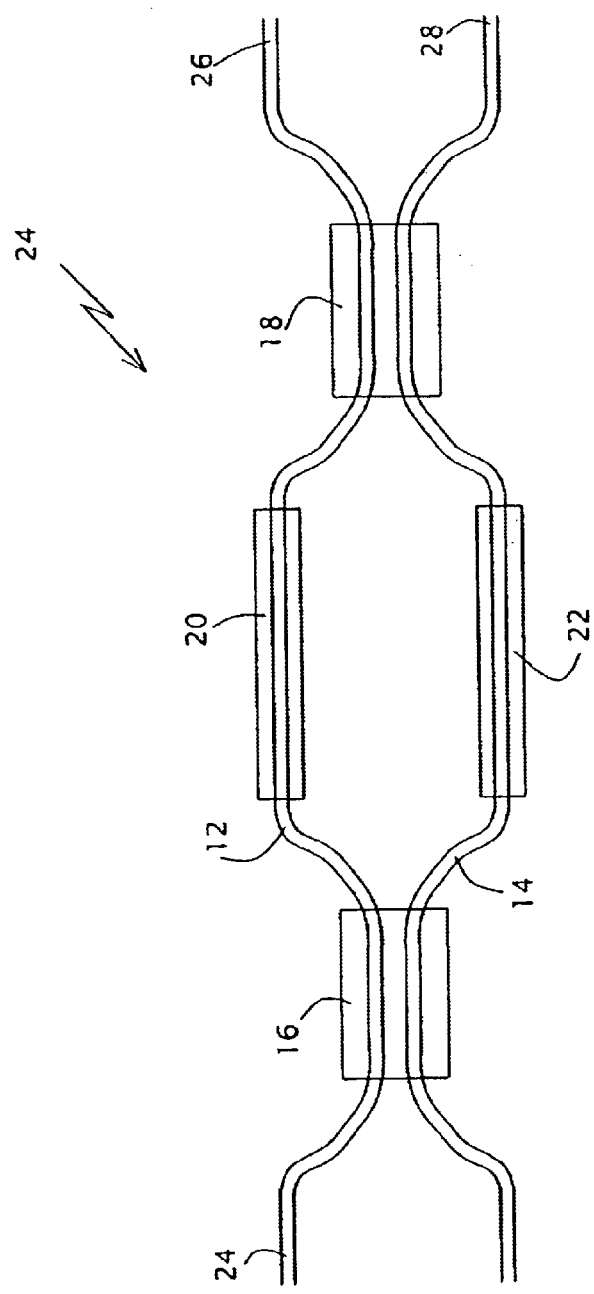
FIG. 1 illustrates a Mach-Zehnder interferometer.
Figure 2:
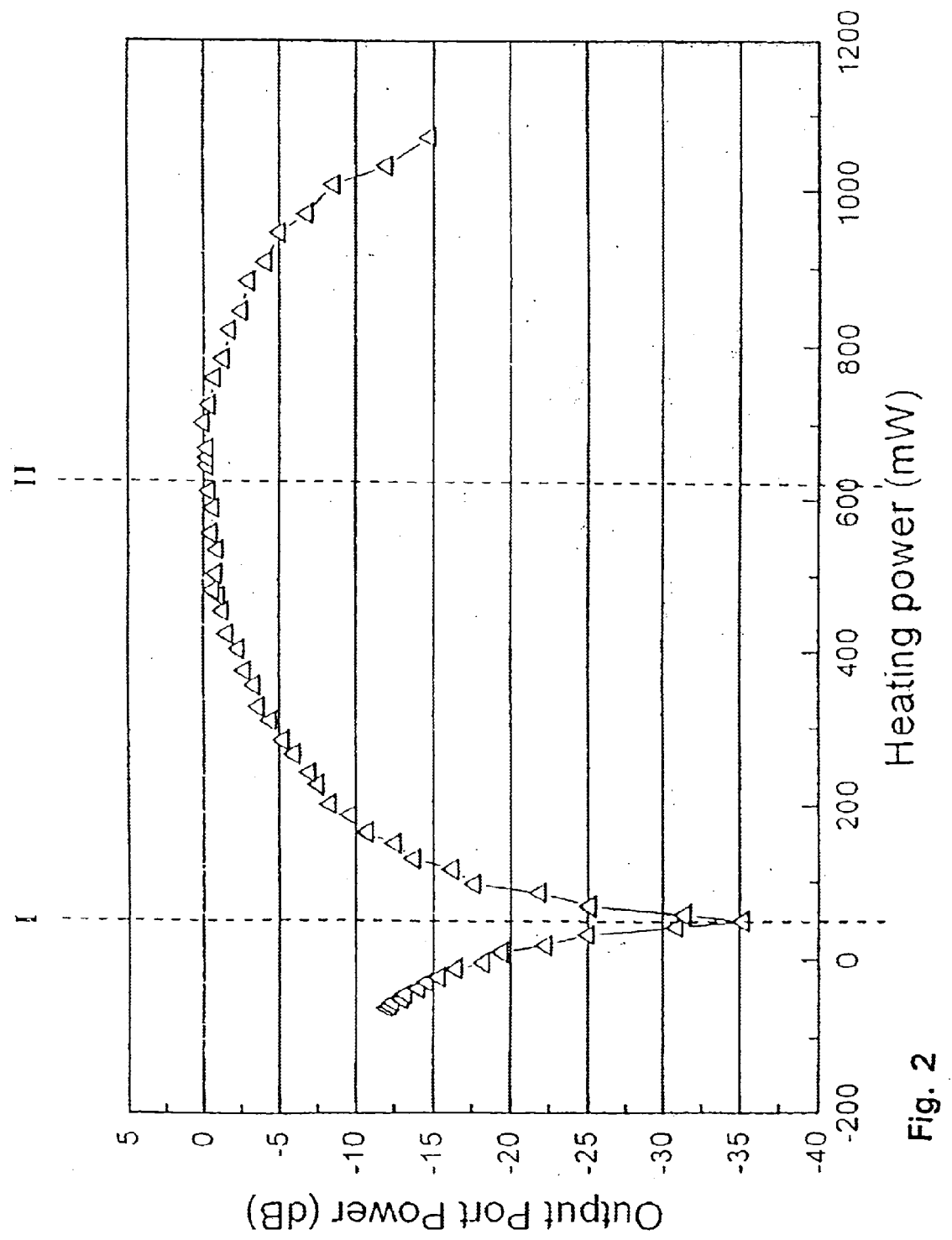
FIG. 2 shows relative output power, as a function of applied heating power, for one particular Mach-Zehnder interferometer.

Each attenuator 110 or 120 is considered OFF in its pass-through state (point I in FIG. 2), in which all optical energy entering via upper input port 112 or 122 leaves via upper output port 116 or 126, and in which all optical energy entering via lower input port 114 or 124 leaves via lower output port 118 or 128. With all attenuators OFF, all optical energy that enters matrix 100 via input waveguides 102 is discarded at idle output ports 118. Turning ON the input attenuator 110 and the output attenuator 120 that couple a particular input waveguide 102 to a particular output waveguide 104, by increasing the heating power applied to the phase shifters of these attenuators 110 and 120 towards point II of FIG. 2, diverts some or all of the optical energy that enters via that input waveguide 102 to that output waveguide 104.

Figure 4:
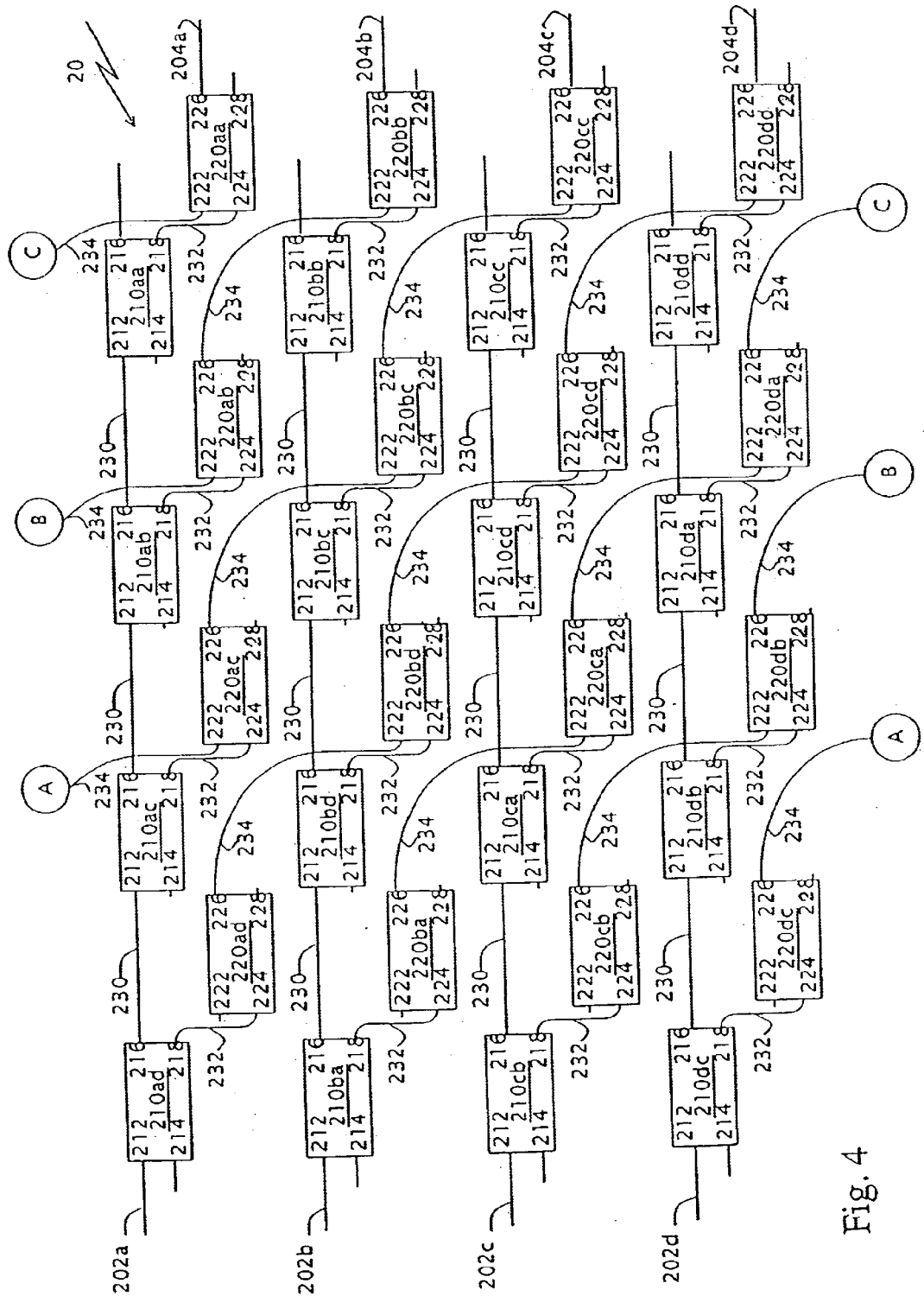
FIG. 4 illustrates the architecture of another optical switch matrix of the present invention.

FIG. 4 illustrates the architecture of another optical switch matrix 200 of the present invention that resembles the optical switch matrix taught in U.S. Pat. No. 6,285,809. Optical switch matrix 200 connects four input waveguides 202 to four output waveguides 204. For this purpose, optical switch matrix 200 includes sixteen input attenuators 210 and sixteen output attenuators 220. Each attenuator 210 or 220 is a Mach-Zehnder interferometer that is substantially identical to Mach-Zehnder interferometer 10. Each input attenuator 210 has an upper input port 212, a lower input port 214, an upper output port 216 and a lower output port 218. Similarly, each output attenuator 220 has an upper input port 222, a lower input port 224, an upper output port 226 and a lower output port 228. Each input waveguide 202 is coupled to each output waveguide 204 by a respective input attenuator 210 and a respective output attenuator 220. The input attenuator 210 and the output attenuator 220 that couple a particular input waveguide 202 to a particular output waveguide 204 are labeled by the corresponding letters: input attenuator 210ad and output attenuator 220ad couple input waveguide 202a to output waveguide 204d, input attenuator 210ba and output attenuator 210ba couple input waveguide 202b to output waveguide 204a, etc.

More specifically, input waveguides 202 lead into upper input ports 212 of input attenuators 210 that couple to the cyclically preceding output waveguides 204: input waveguide 202a leads into upper input port 212 of input attenuator 210ad, input waveguide 202b leads into upper input port 212 of input attenuator 210ba, input waveguide 202c leads into upper input port 212 of input attenuator 210cb and input waveguide 202d leads into upper input port 212 of input attenuator 210dc. Output waveguides 204 emerge from upper output ports 226 of output attenuators 220 that couple to the corresponding input waveguides 202: output waveguide 204a emerges from upper output port 226 of output attenuator 220aa, output waveguide 204b emerges from upper output port 226 of output attenuator 220bb, output waveguide 204c emerges from upper output port 226 of output attenuator 220cc and output waveguide 204d emerges from upper output port 226 of output attenuator 220dd. Each input attenuator 210 is coupled to its respective output attenuator 220 by a respective intermediate waveguide 232 that leads from lower output port 218 of that input attenuator 210 to lower input port 224 of that output attenuator 220. All lower ports 214 of input attenuators 210 are idle. Similarly, all lower output ports 228 of output attenuators 220 are idle. Upper output ports of input attenuators 210aa, 210bb, 210cc and 210dd, that couple input waveguides 202 to corresponding output waveguides 204, are idle. A respective intermediate waveguide 230 leads from upper output port 216 of each of the other input attenuators 210 to upper input port 212 of input attenuator 210 that couples the same input waveguide 202 to the cyclically preceding output waveguide 204. For example, an intermediate waveguide 230 leads from upper output port 216 of input attenuator 210cb to upper input port 212 of input attenuator 210ca, another intermediate waveguide 230 leads from upper output port 216 of input attenuator 210ca to upper input port 212 of input attenuator 210cd, and yet another intermediate waveguide 230 leads from upper output port 216 of input attenuator 210cd to upper input port 212 of input attenuator 210cc. Upper input ports 222 of output attenuators 220ad, 220ba, 220cb and 220dc, that couple input waveguides 202 to cyclically preceding output waveguides 204, are idle. A respective intermediate waveguide 234 leads to upper input port 222 of each of the other output attenuators 220 from upper output port 226 of output attenuator 220 that couples the same output waveguide 204 to the cyclically preceding input waveguide 202. For example, an intermediate waveguide 234 leads to upper input port 222 of output attenuator 220ac from upper output port 226 of output attenuator 220dc, another intermediate waveguide 234 leads to upper input port 222 of output attenuator 220bc from upper output port 226 of output attenuator 220ac, and yet another intermediate waveguide 234 leads to upper input port 222 of output attenuator 220cc from upper output port 226 of output attenuator 220bc. Intermediate waveguides 234, that connect output attenuators 220dc, 220db and 220da to output attenuators 220ac, 220ab and 220aa, respectively, do so by wrapping around, as indicated by terminations A, B and C, typically by crossing either input waveguides 202 or output waveguides 204.

As in Mach-Zehnder interferometer 10, upper input port 212 and upper output port 216 of each input attenuator 210 actually are opposite ends of the same internal upper waveguide, and upper input port 222 and upper output port 226 of each output attenuator 220 actually are opposite ends of the same internal upper waveguide, so that intermediate waveguides 230 actually are extensions of respective input waveguides 202 and intermediate waveguides 234 actually are extensions of respective output waveguides 204.

Each attenuator 210 or 220 is considered OFF in its pass-through state (point I in FIG. 2), in which all optical energy entering via upper port 212 or 222 leaves via upper output port 216 or 226, and in which all optical energy entering via lower input port 214 or 224 leaves via lower output port 218 or 228. With all attenuators OFF, all optical energy that enters matrix 200 via input waveguides 202 is discarded at idle output ports 216. Turning ON the input attenuator 210 and the output attenuator 220 that couple a particular input waveguide 202 to a particular output waveguide 204, by increasing the heating power applied to the phase shifters of these attenuators 210 and 220 towards point II of FIG. 2, diverts some or all of the optical energy that enters via that input waveguide 202 to that output waveguide 204.

Figure 5:
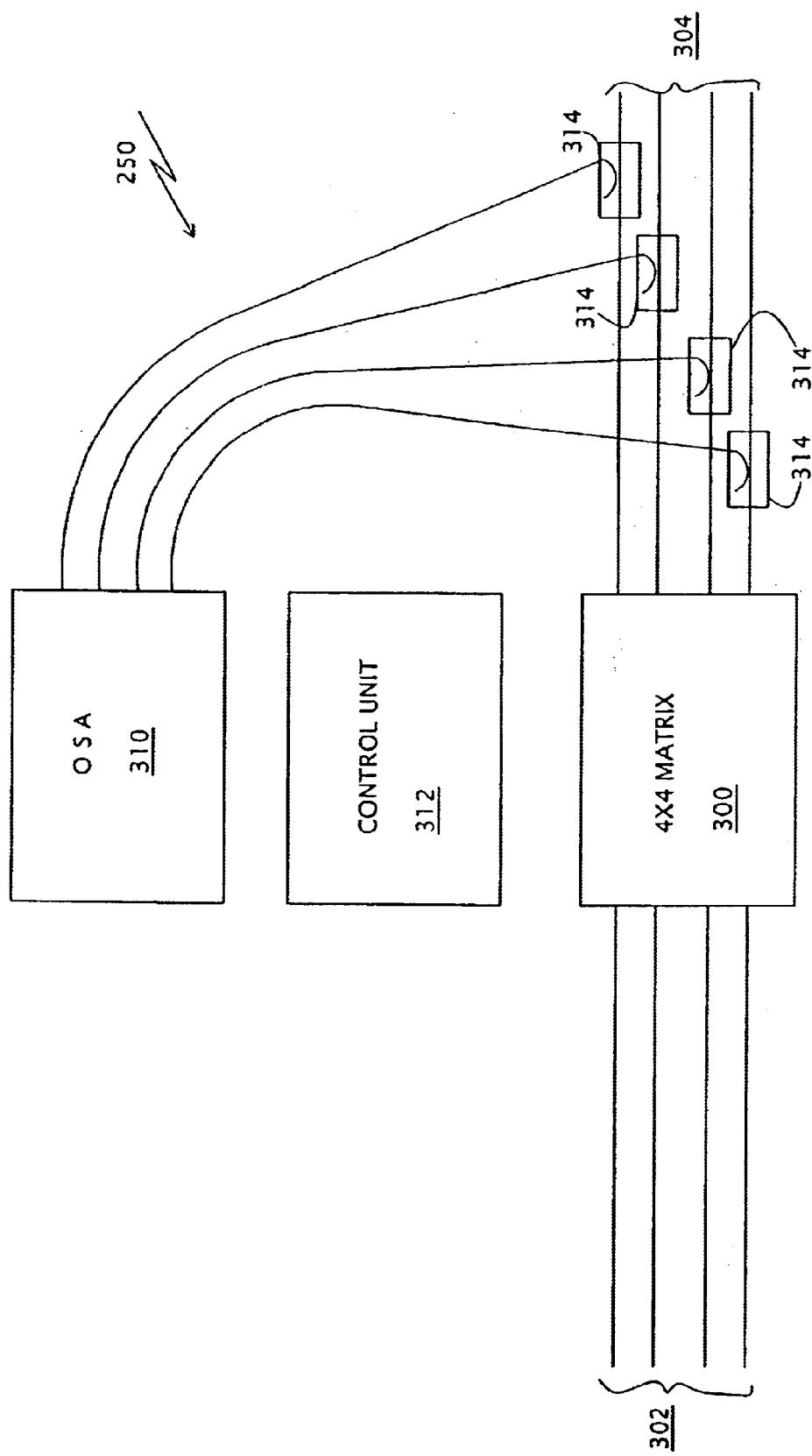
FIG. 5 is a high level block diagram of a complete system of the present invention.

FIG. 5 is a high level block diagram of a complete optical switching system 250 of the present invention. In addition to a 4×4 optical switch matrix 300, for switching optical signals from four input waveguides 302 to four output waveguides 304, system 250 includes a feedback mechanism that determines the power of the optical signals that emerge from matrix 300 via output waveguides 304 and adjusts No the attenuators of matrix 300 accordingly to balance power in output waveguides 304 in real time. Matrix 300 may be matrix 100, as described above, or matrix 200, as described above. The feedback mechanism includes an optical spectrum analyzer 310, a control unit 312 and a set of optical taps 314. Each tap 314 diverts a small, fixed portion of the power in a respective one of output waveguides 304, from that waveguide 304 to spectrum analyzer 310. Spectrum analyzer 310, which is illustrative of a power measurement device, measures the power diverted thereto from each output waveguide 304 and sends signals representative of those powers to control unit 312. Based on those signals, control unit 312 adjusts the attenuators of matrix 300 to balance the powers in output waveguides 304. Preferably, taps 314 are based on directional couplers. Preferably, control unit 312 is based on a personal computer. Control unit 312 also includes an electronic driver for adjusting the heating power applied to the phase shifters of the attenuators of matrix 300 in accordance with control signals that the driver receives from the personal computer.

Figure 6:
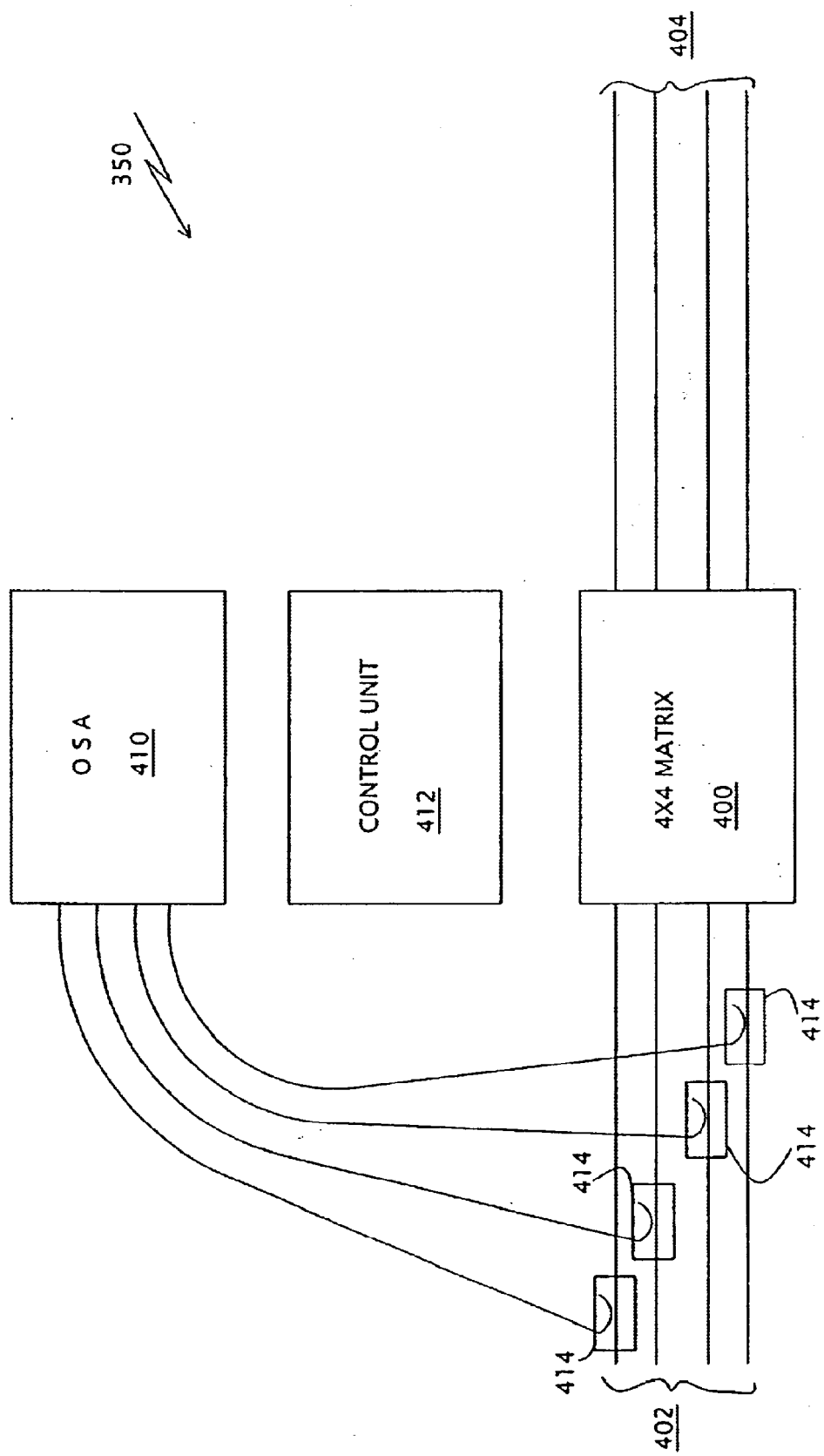
FIG. 6 is a high level block diagram of another complete system of the present invention.

FIG. 6 is a high level block diagram of an alternative optical switching system 350 of the present invention. Like system 250, system 350 includes a 4×4 optical switching matrix 400, for switching optical signals from four input waveguides 402 to four output waveguides 404, a set of optical taps 414, an optical spectrum analyzer 410 and a control unit 412. Taps 414, spectrum analyzer 410 and control unit 414 are substantially identical to taps 314, spectrum analyzer 310 and control unit 314 of system 250. The main difference between system 250 and system 350 is that in system 350, taps 414 divert, to spectrum analyzer 410, small, fixed portions of the powers in input waveguides 402, rather than small fixed portions of the powers in output waveguides 404. Otherwise, the structure and operation of system 350 is substantially identical to the structure and operation of system 250. Spectrum analyzer 410 measures the power diverted thereto from each input waveguide 402 and sends signals representative of those powers to control unit 412. Based on those signals, control unit 412 adjusts the attenuators of matrix 400 to balance the powers in output waveguides 404.

The extent to which power is balanced in output waveguides 304 or 404 by systems 250 or 350 depends on the resolution of the respective electronic drivers. There is a trade off between the dynamic range of the driver and the precision with which power in output waveguides 304 or 404 is balanced. An electronic driver typically is digital, with a fixed, predetermined number of steps. An electronic driver with a large step size has a large dynamic range, at the expense of low precision. An electronic driver with small step size has high precision, at the expense of a limited dynamic range.

While the invention has been described with respect to a limited number of embodiments, it will be appreciated that many variations, modifications and other applications of the invention may be made.

What is claimed is:

1. An optical switching system, for switching optical energy from a plurality of input waveguides to a plurality of output waveguides, comprising: for each output waveguide: for each input waveguide: at least one respective attenuator, for diverting an adjustable portion of the optical energy entering via said each input waveguide to said each output waveguide, each said attenuator being adjusted to selectively pass a portion, of the optical energy input thereto, that is selected from the group consisting of substantially all of the optical energy input thereto, only some of the optical energy input thereto and substantially none of the optical energy input thereto, at least one of each said at least one respective attenuator including a Mach-Zehnder interferometer and having at most one idle port.

2. The system of claim 1, wherein: for each output waveguide: for each input waveguide: one of said at least one respective attenuator includes a 2×2 switch having an idle output port.

3. The system of claim 1, wherein: for each output waveguide: for each input waveguide: one of said at least one respective attenuator includes a 2×2 switch having an idle input port.

4. An optical switching system, for switching optical energy from a plurality of input waveguides to a plurality of output waveguides, comprising: for each output waveguide: for each input waveguide: two respective attenuators, for diverting an adjustable portion of the optical energy entering via said each input waveguide to said each output waveguide, each said attenuator being adjusted to selectively pass a portion, of the optical energy input thereto, that is selected from the group consisting of substantially all of the optical energy input thereto, only some of the optical energy input thereto and substantially none of the optical energy input thereto.

5. An optical switching system for switching optical energy from a plurality of input waveguides to a plurality of output waveguides, comprising:

(a) for each input waveguide, a respective input attenuator that is directly optically coupled to said each input waveguide; and (b) for each output waveguide, a respective output attenuator that is directly optically coupled to said each output waveguide;

wherein said input attenuators are optically coupled to said output attenuators, and wherein at least one said input attenuator and at least one said output attenuator are adjusted to selectively pass a portion, of the optical energy input thereto, that is selected from the group consisting of substantially all of the optical energy input thereto, only some of the optical energy input thereto and substantially none of the optical energy input thereto.

6. The system of claim 5, further comprising:

(c) at least one intermediate attenuator, said output attenuators being optically coupled to said input attenuators via said at least one intermediate attenuator.

7. The system of claim 5, wherein every said input attenuator and every said output attenuator is adjustable to selectively pass a portion, of the optical energy input thereto, that is selected from the group consisting of substantially all of the optical energy input thereto, only some of the optical energy input thereto and substantially none of the optical energy input thereto.

8. The system of claim 5, wherein each said output attenuator is directly optically coupled to only one of the output waveguides.

9. The system of claim 5, wherein every said input attenuator and every said output attenuator is adjusted to selectively pass a portion, of the optical energy input thereto, that is selected from the group consisting of substantially all of the optical energy input thereto, only some of the optical energy input thereto and substantially none of the optical energy input thereto.

10. An optical switching system, for switching optical energy from a plurality of input waveguides to a plurality of output waveguides, comprising: a minimum plurality of optical switches operationally connected to the input waveguides and to the output waveguides according to a certain architecture, wherein, for each output waveguide: for each input waveguide: at least one respective one of said optical switches is an attenuator for diverting an adjustable portion of the optical energy entering via said each input waveguide to said each output waveguide, each said attenuator being adjusted to selectively pass a portion, of the optical energy input thereto, that is selected from the group consisting of substantially all of the optical energy input thereto, only some of the optical energy input thereto and substantially none of the optical energy input thereto.

11. The optical switching system of claim 10, wherein said architecture is a double crossbar architecture.

* * * * *